United States Patent
Gentner et al.

(10) Patent No.: US 7,637,451 B2
(45) Date of Patent: Dec. 29, 2009

(54) BELT RETRACTOR FOR A VEHICLE OCCUPANT SEAT BELT

(75) Inventors: Bernd Gentner, Ellwangen (DE); Nizam Bedak, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 11/974,748

(22) Filed: Oct. 16, 2007

(65) Prior Publication Data

US 2008/0093495 A1 Apr. 24, 2008

(30) Foreign Application Priority Data

Oct. 23, 2006 (DE) .................. 10 2006 049 840

(51) Int. Cl.
*B60R 22/28* (2006.01)
(52) U.S. Cl. .............. 242/379.1; 280/805; 297/471
(58) Field of Classification Search .............. 242/379.1; 280/805; 297/471, 472
See application file for complete search history.

(56) References Cited

U.S. PATENT DOCUMENTS

| 5,836,534 | A | 11/1998 | Bohmler | |
| 6,276,626 | B1 * | 8/2001 | Tanaka et al. | 242/379.1 |
| 6,322,017 | B1 * | 11/2001 | Smithson et al. | 242/379.1 |
| 6,416,007 | B1 * | 7/2002 | Stegmeier | 242/379.1 |
| 6,481,659 | B1 * | 11/2002 | Ashtiani et al. | 242/379.1 |
| 2008/0061180 | A1 * | 3/2008 | Webber et al. | 242/379.1 |

FOREIGN PATENT DOCUMENTS

| DE | 29513942 | 2/1997 |
| DE | 29912024 | 12/1999 |

* cited by examiner

*Primary Examiner*—Sang Kim
(74) *Attorney, Agent, or Firm*—Tarolli, Hundheim, Covell & Tummino LLP

(57) ABSTRACT

A belt retractor for a vehicle occupant seat belt has a belt reel (14), a locking disc (16) and a force limiting element (22), the force limiting element (22) being provided with a thread (28) and the force limiting element (22) acting between the belt reel (14) and the locking disc (16) so that a translational movement is generated when a relative rotation between the belt reel (14) and the locking disc (16) takes place.

9 Claims, 6 Drawing Sheets

BELT RETRACTOR FOR A VEHICLE OCCUPANT SEAT BELT

TECHNICAL FIELD

The invention relates to a belt retractor for a vehicle occupant seat belt.

BACKGROUND OF THE INVENTION

Belt retractors having force limiters are known from the prior art. The force limiter serves to limit the maximum forces acting in the seat belt in particular in case of an accident such that injuries of a restrained vehicle occupant are precluded. The limitation of the force is achieved by the fact that a rotation of the belt reel is permitted in order to unwind belt webbing when a certain belt webbing force is exceeded so that the force acting on the vehicle occupant is reduced.

A known structure of a force limiter uses a torsion bar which is connected at one end to a belt reel and is supported at the other end by a frame of the belt retractor. As soon as the torque acting on the belt reel due to the tensile forces acting in the belt webbing exceeds the resistance to torsion of the torsion bar, the torsion bar is twisted so that a rotation of the belt reel in the direction of belt webbing withdrawal takes place and thus the withdrawal of belt webbing is possible.

It is basically desirable to have a switchable force limiter. In this way, a strong belt webbing force can be used in a first condition, for example before a contact between a gas bag and the upper part of the body of the vehicle occupant, and a small belt webbing force can be permitted in a second condition, for example when the upper part of the body of the vehicle occupant is supported by the air bag.

The object of the invention is to provide a belt retractor for a vehicle occupant seat belt which is space-saving and permits different force limitation levels.

BRIEF SUMMARY OF THE INVENTION

According to the invention, a belt retractor for a vehicle occupant seat belt has a belt reel, a locking disc and a force limiting element, the force limiting element being provided with a thread and the force limiting element acting between the belt reel and the locking disc so that a translational movement is generated when a relative rotation between the belt reel and the locking disc takes place.

If a load exceeding the resistive torque of the force limiting element is applied to the belt reel by means of the seat belt when the locking disc is blocked, the belt reel is rotated with respect to the locking disc. According to the invention, the translational movement is thereby generated. The translational movement is used to modify the characteristic of the force limiter. As soon as the translational movement is stopped, it is switched to a different force level. The fact that the translational movement is permitted, along with a simple structure of the belt retractor, permits to have a changing characteristic of the force limiter.

A stop is preferably provided which stops the translational movement. The stop determines the moment as of which the translational movement of the force limiting element or of a bypass sleeve is stopped, i.e. the moment as of which a torsion of a part of the force limiting element occurs, for example. The profile of the force limitation can be adjusted and modified depending on the degree of the engagement of the stop.

BRIEF DESCRIPTION OF THE PREFERRED EMBODIMENTS

Figure 1:
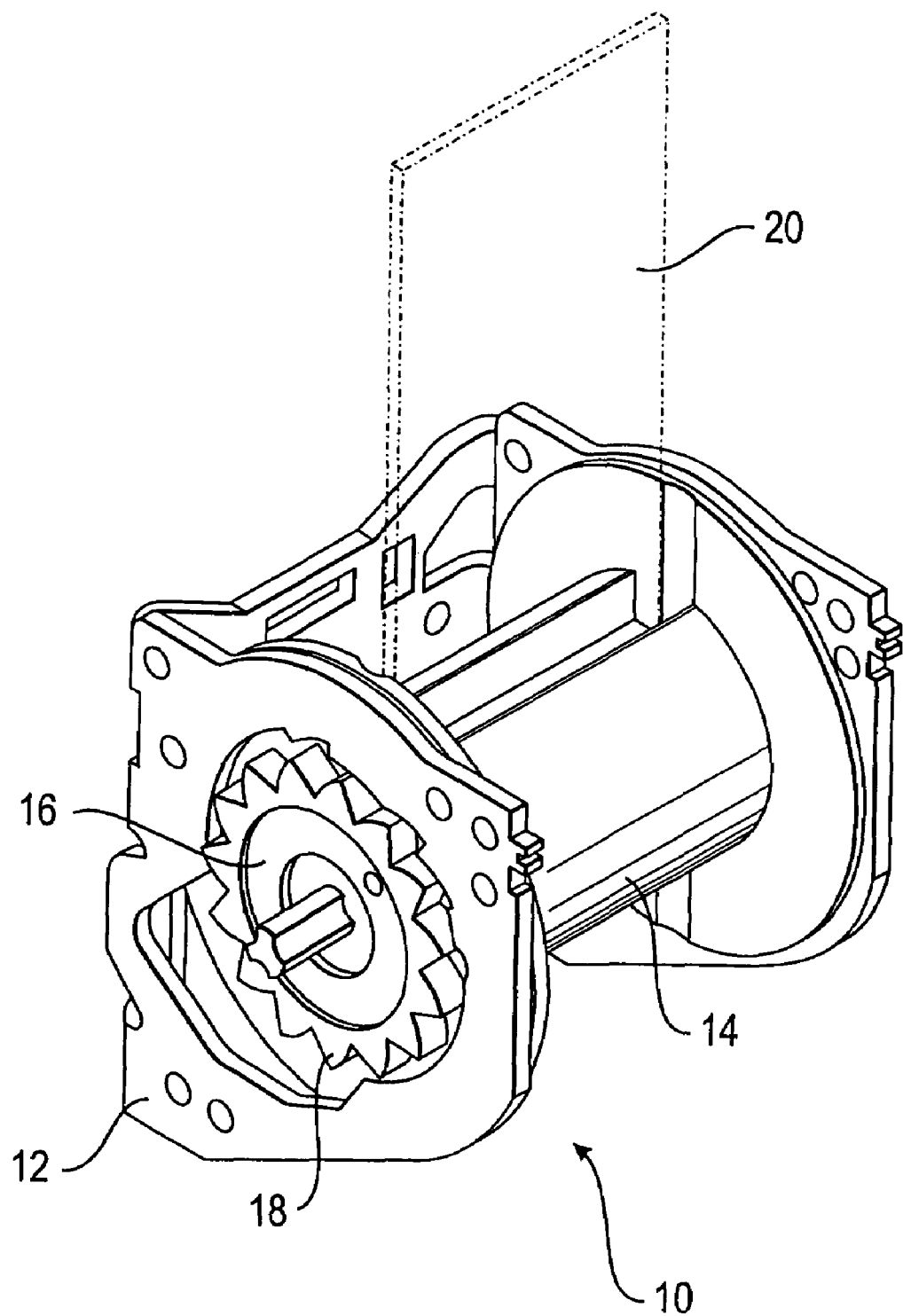
FIG. 1 shows a perspective view of a belt retractor for a vehicle occupant seat belt.

A belt retractor 10 having a frame 12 in which a belt reel 14 is rotatably mounted is shown schematically in FIG. 1. A locking disc 16 having a locking toothing 18 in which a locking pawl (not shown) may be caused to engage is provided at one axial end of the belt reel 14. A seat belt 20 can be wound on the belt reel 14.

Figure 2:
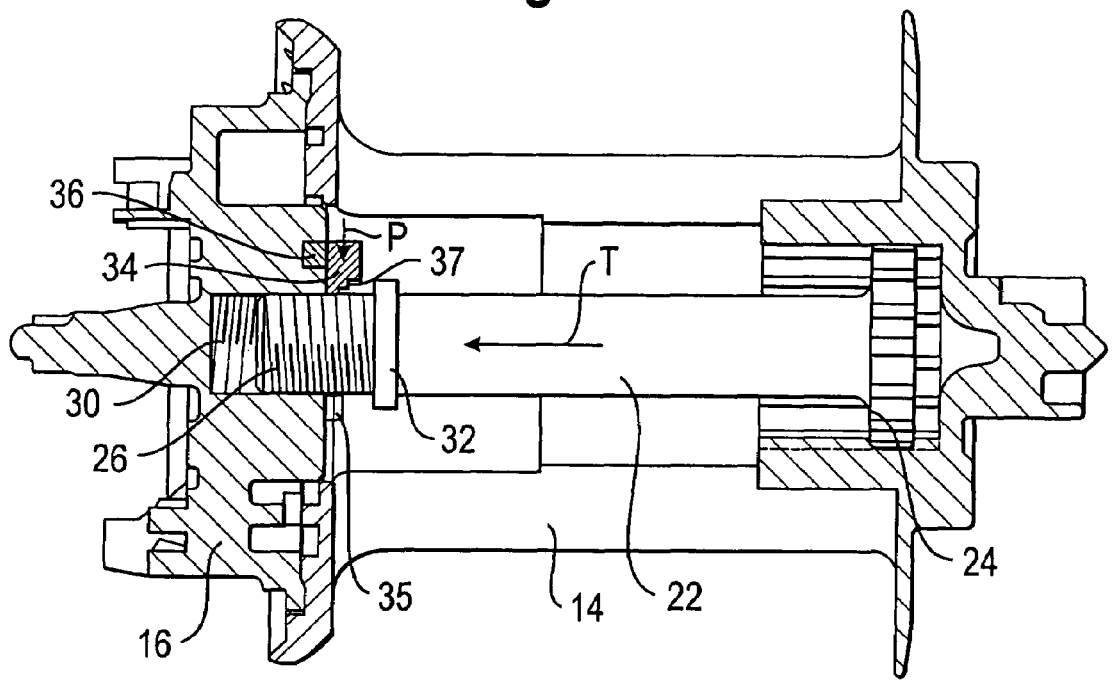
FIG. 2 shows a sectional view of a belt reel for a belt retractor according to the invention in a first embodiment, a force limiting element being in an initial position.
Figure 3:
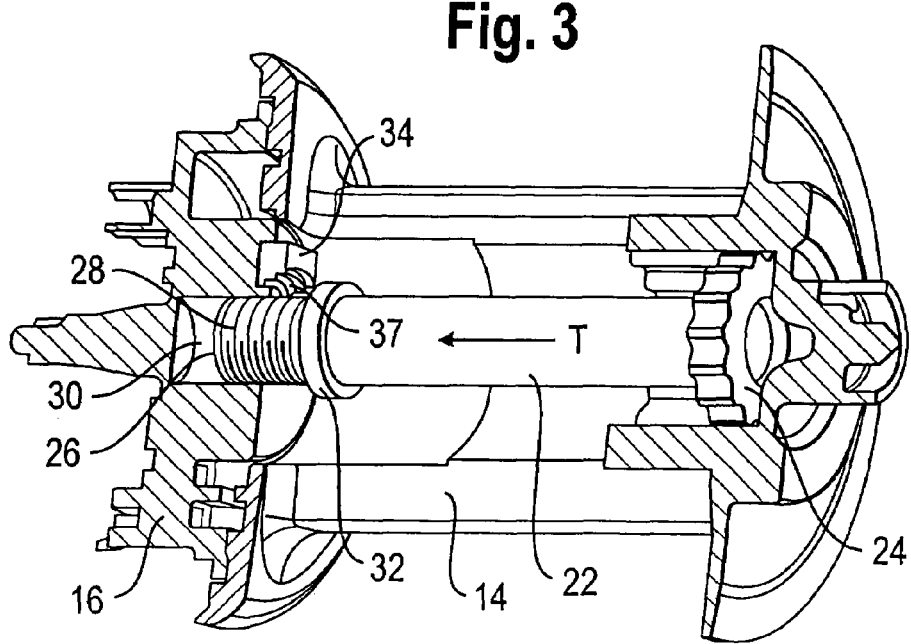
FIG. 3 shows a perspective view of the belt reel corresponding to FIG. 2.
Figure 4:
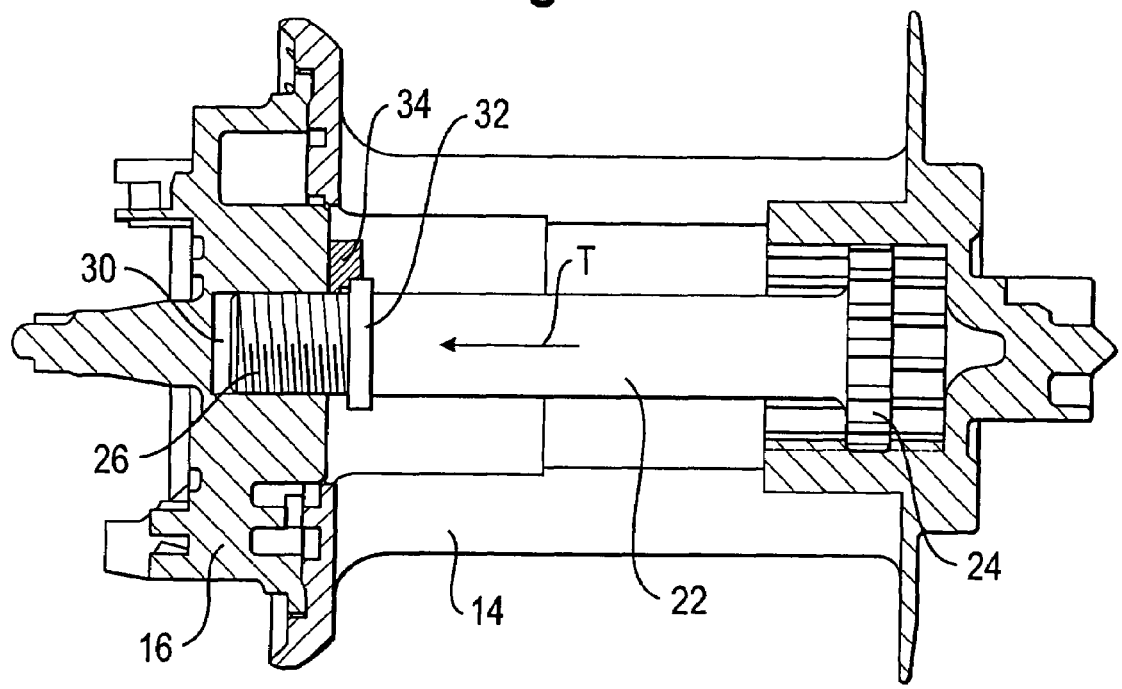
FIG. 4 shows a sectional view of the belt reel of FIGS. 2 and 3, the force limiting element being in an end position.

FIGS. 2 to 4 show the belt retractor 10 in a first embodiment.

A force limiting element 22 which acts between the belt reel 14 and the locking disc 16 and which is configured as a torsion bar is arranged inside the belt reel 14.

The force limiting element 22 has a first axial end 24 and a second axial end 26. The first axial end 24 of the force limiting element 22 is provided with a multi-groove profile and is connected to the belt reel 14 for joint rotation therewith. The second axial end 26 of the force limiting element 22 has a thread 28 (FIG. 2) and is received in a threaded bore 30 of the locking disc 16. The force limiting element 22 can be screwed in the threaded bore 30 and can be shifted in translation towards the locking disc 16 (arrow T) since the first axial end 24 is shiftably connected to the belt reel 14.

In the region of the second axial end 26, the force limiting element 22 has a surrounding projecting collar 32 which can engage a stop 34 (FIG. 4). The stop 34 can be shifted towards the force limiting element 22 (arrow P) by an actuator 36 which is shown schematically in FIG. 2. The actuator 36 which displaces the stop 34 is a mechanical, electrical, magnetic or pyrotechnical actuator.

The stop 34 has an abutment surface 37 which faces the force limiting element 22 and which is stepped (cf. in particular FIG. 3). The abutment surface 37 could also be configured in a straight or inclined manner (not shown).

The mode of operation of the belt retractor 10 is explained in the following.

If the torque which acts on the belt reel 14 due to the tensile forces acting in the seat belt 20 is larger than the resistive torque of the force limiting element 22 in the blocked state of the locking disc 16, the belt reel 14 rotates. Since the first axial end 24 of the force limiting element 22 is connected to the belt reel 14 for joint rotation therewith, the first axial end 24 of the force limiting element 22 rotates with the belt reel 14. Since the second axial end 26 is movably received in the bore 30, it is screwed into the bore 30 of the locking disc 16 due to the rotation of the first axial end 24 and moves towards the locking disc 16 (arrow T).

As long as the thread 28 of the second axial end 26 of the force limiting element 22 can be screwed in the threaded bore 30 of the locking disc 16, a force limitation by means of torsion does not occur. However, a cutting body 35 which is shown schematically in FIG. 2 and which is mounted on the belt reel 14 and projects axially beyond the end face of the belt reel 14 facing the disc 16 thus cuts material of the disc 16.

As soon as the collar 32 of the force limiting element 22 rests against the stop 34, the translational movement of the force limiting element 22 is stopped, and the second axial end 26 is now coupled to the locking disc 16 for joint rotation therewith. This is the reason why the force limiting element 22 is twisted when the belt reel 14 is further loaded by the seat belt 20. This leads to a torsion of the force limiting element 22.

Figure 5:
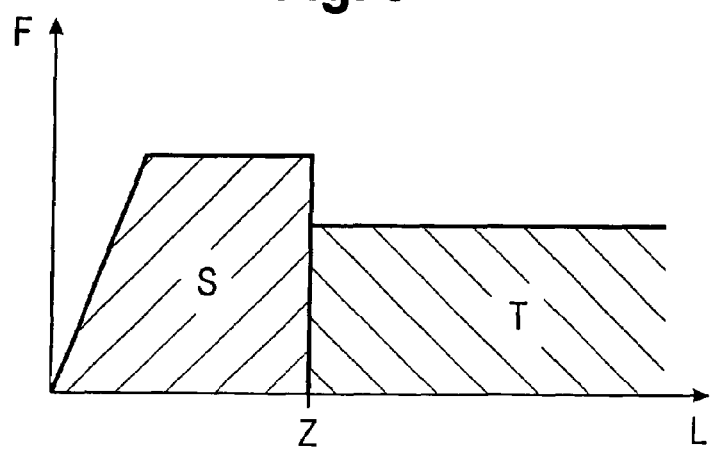
FIG. 5 shows a diagram representing the characteristic of a force limiter used in FIGS. 2 to 4.

The stop 34 determines the moment as of which the force limiting element 22 is coupled to the locking disc 16, i.e. the moment as of which the force limiting element 22 is twisted (cf. Z in FIG. 5). The characteristic of the force limiter can thus be adjusted and modified depending on the degree of the engagement of the stop 34. The stop 34 can be caused to preengage or can be displaced accordingly in case of an accident.

FIG. 5 shows the force profile F as a function of the belt webbing withdrawal length L. It can be seen in FIG. 5 that at the beginning, a force limitation by cutting takes place (cf. hatched region S) until the translational movement of the force limiting element 22 is stopped (moment Z). The force limitation is then realized by means of torsion (cf. hatched region T), the permitted belt webbing force during the torsion being smaller than that during the cutting.

If the bore 30 of the locking disc is not a threaded bore and the thread 28 at the second axial end 26 of the force limiting element 22 is self-tapping (not shown), a force limitation by means of cutting occurs until the collar 32 of the force limiting element 22 rests against the stop 34. The force limitation then occurs by the torsion of the force limiting element 22.

Figure 6:
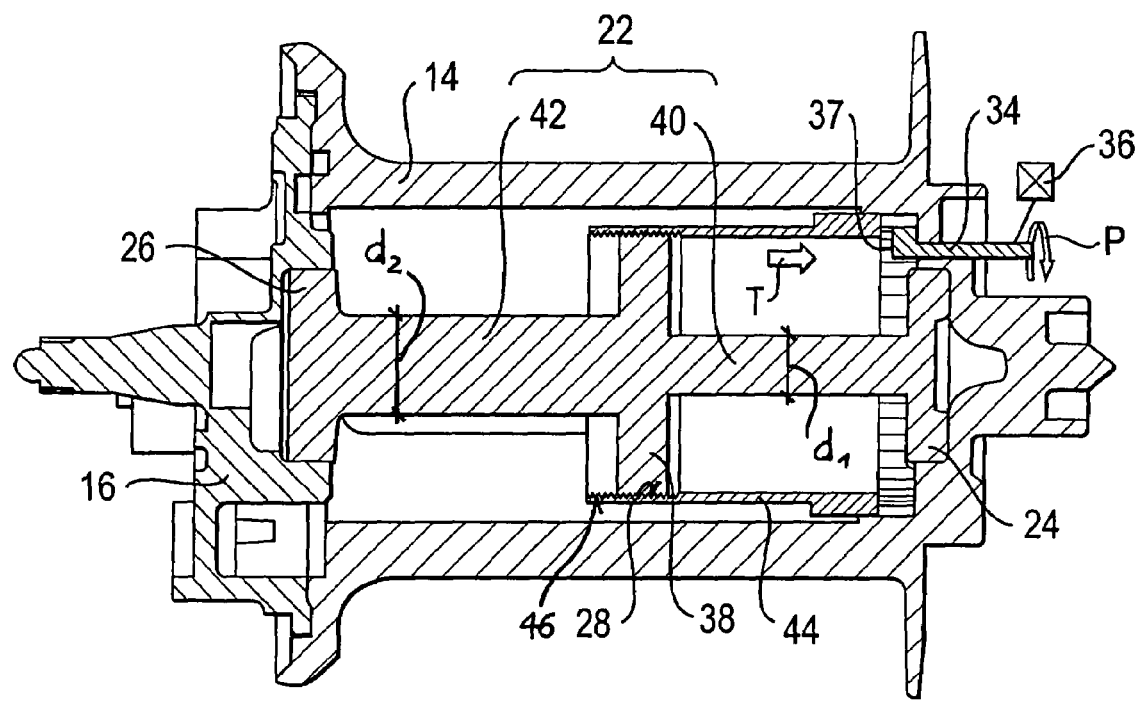
FIG. 6 shows a sectional view of a belt reel for a belt retractor according to the invention in a second embodiment, a bypass sleeve being in an initial position.
Figure 7:
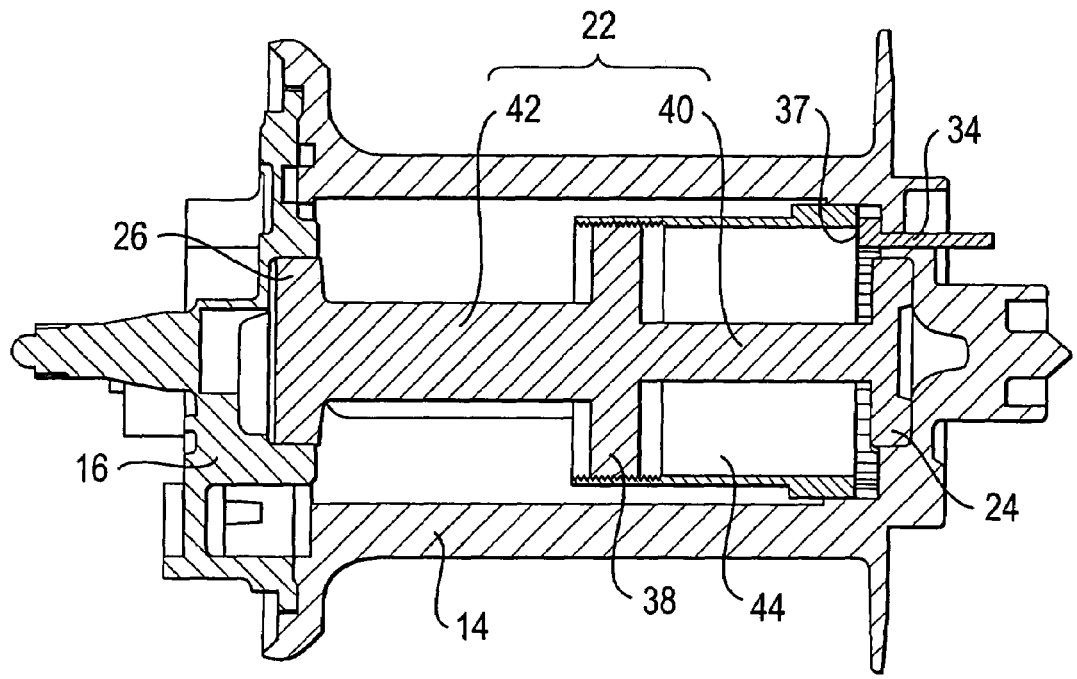
FIG. 7 shows a sectional view of the belt reel of FIG. 6, the bypass sleeve being in a first end position.
Figure 8:
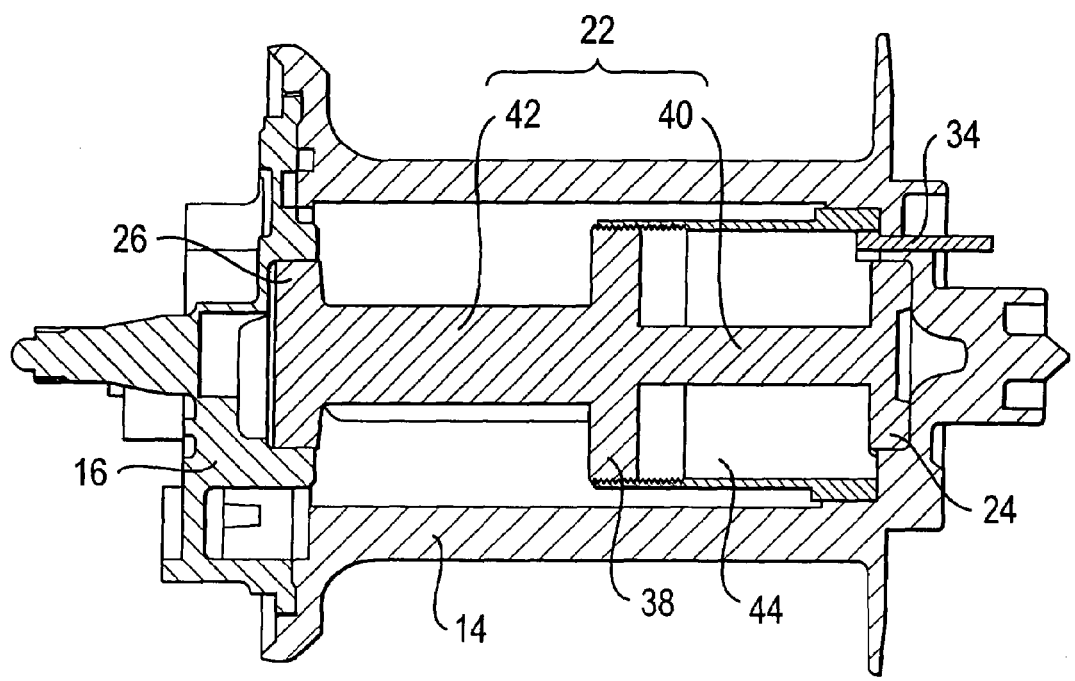
FIG. 8 shows a sectional view of the belt reel of FIGS. 6 and 7, the bypass sleeve being in a second end position.

FIGS. 6 to 8 show the belt retractor 10 in a second embodiment.

The force limiting element 22 which is also formed as a torsion bar in this case, is arranged inside the belt reel 14. Unlike the first embodiment, the torsion bar is divided up in two portions by a web 38, i.e. in a first portion 40 and a second portion 42. The first portion 40 of the force limiting element 22 has a cross-section which is smaller than the cross-section of the second portion 42, i.e. the resistance to torsion of the first portion 40 is smaller than that of the second portion 42. FIG. 6 shows the diameters $d_1$ and $d_2$ of the first and the second portions 40, 42 of the force limiting element 22.

The first axial end 24 and the second axial end 26 are provided with a multi-groove profile, the first axial end 24 of the force limiting element 22 being coupled to the belt reel 14 for joint rotation therewith and the second axial end 26 of the force limiting element 22 being connected to the locking disc 16 for joint rotation therewith by means of the multi-groove profile.

The inside of the belt reel 14 is provided with a bypass sleeve 44 comprising an internal thread 46 in which the web 38 of the force limiting element 22 provided with the thread 28 is screwed. The bypass sleeve 44 can be shifted in the direction of the arrow T (to the right with respect to FIG. 6) and is shown in its initial position in FIG. 6. FIGS. 7 and 8 show the bypass sleeve 44 in two different end positions which it can take. In FIG. 7, it rests against the adjustable stop 34, and in FIG. 8 it rests against the belt reel 14. The belt reel 14 can thus be used as a stop for the bypass sleeve 44.

The mode of operation of the second embodiment is explained in the following.

If the locking, pawl which is not shown is caused to engage in the locking toothing 18 of the locking disc 16, the locking disc 16 and the second axial end 26 of the force limiting element 22 connected thereto are blocked. As soon as the torque which acts on the belt reel 14 due to the forces acting in the seat belt 20 is larger than the resistance to torsion of the force limiting element 22, this leads to a torsion of the force limiting element 22. Due to the small resistance to torsion of the first portion 40 of the force limiting element 22, the first portion 40 is twisted to a larger extent than the second portion 42. Since the rotation of the web 38 which connects the two portions 40, 42 to each other, is slower than that of the belt reel 14, a relative rotation between the bypass sleeve 44 and the web 38 occurs. The thread 28 and the internal thread 46 of the bypass sleeve 44 are then chosen such that the bypass sleeve 44 is shifted in the direction of the arrow T (to the right with respect to FIG. 6). When the twist of the force limiting element 22 increases, the bypass sleeve 44 is shifted to the right until it rests against the stop 34 (FIG. 7) or, against the belt reel 14 (FIG. 8). As soon as the translational movement of the bypass sleeve 44 is stopped, the bypass sleeve 44 is connected to the belt reel 14 for joint rotation therewith, and the first portion 40 of the force limiting element 22 is bypassed by the bypass sleeve 44 so that only the second portion 42 of the force limiting element 22 is twisted when the belt reel 14 is further loaded by the seat belt 20.

The stop 34 determines the moment as of which the translational movement of the bypass sleeve 44 is prevented, i.e. the moment as of which the first portion 40 of the force limiting element 22 is bypassed. The profile of the force limitation can thus be adjusted and modified depending on the degree of the engagement of the stop 34. The stop 34 can be caused to preengage or be displaced accordingly in case of an accident.

Figure 9:
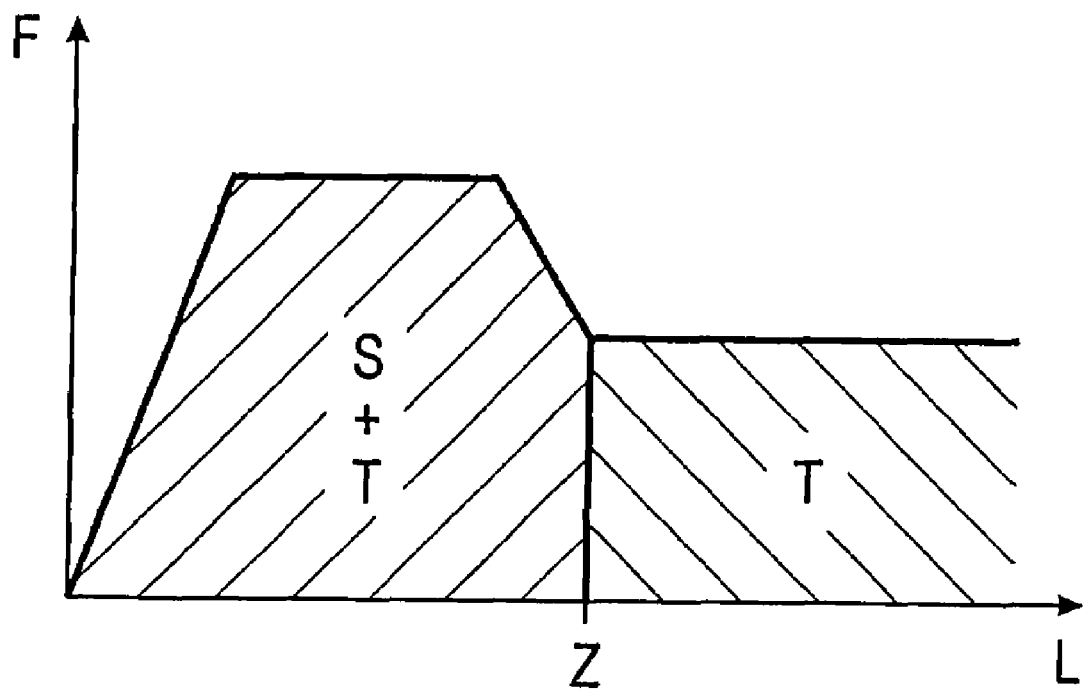
FIG. 9 shows a diagram representing the characteristic of a force limiter used in FIGS. 6 to 8.

FIG. 9 shows the force profile F as a function of the belt webbing withdrawal length L; Initially, a force limitation occurs by the torsion of the torsion bar 20 and possibly simultaneously by means of the cutting by the cutting body which is not shown and which is mounted on the belt reel 14 and projects axially beyond the end face of the belt reel 14 facing the disc 16 (cf. hatched region in FIG. 9 denoted by S+T). As soon as the bypass sleeve 44 is connected to the belt reel 14 for joint rotation therewith (moment Z), the force limitation occurs exclusively by the torsion of the second portion 42 of the force limiting element 22 (cf. hatched region T in FIG. 9).

Though the force limiting element 22 is shown as a torsion bar in the embodiments, a force limitation could also be realized by means of forming, bending, cutting etc.

The invention claimed is:

1. A belt retractor for a vehicle occupant seat belt, having
a belt reel (14),
a locking disc (16) and
a force limiting element (22),
said force limiting element (22) acting between said belt reel (14) and said locking disc (16),
said force limiting element (22) having a first axial end which is shiftably connected to said belt reel (14), and a second axial end which is provided with a thread (28) so that a translational movement of said force limiting element (22) and of said first axial end thereof is generated when a relative rotation between said belt reel (14) and said locking disc (16) takes place.

2. The belt retractor according to claim 1, wherein said force limiting element (22) is screwed in said locking disc (16) by means of said thread (28) so that a translational movement between said locking disc (16) and said force limiting element (22) takes place.

3. The belt retractor according to claim 1, wherein a bypass sleeve (44) is provided and said force limiting element (22) is divided up into a first portion (40) and a second portion (42) by said thread (28), said thread (28) being screwed in said bypass sleeve (44) so that a translational movement between said bypass sleeve (44) and said force limiting element (22) takes place.

4. The belt retractor according to claim 3, wherein said first portion (40) and said second portion (42) of said force limiting element (22) have a cross-section, the cross-section of said first portion (40) being smaller than that of said second portion (42).

5. The belt retractor according to claim 1, wherein said force limiting element (22) is a torsion bar.

6. The belt retractor according to claim 1, wherein a stop (34) is provided which stops a translational movement.

7. The belt retractor according to claim 6, wherein said stop (34) is adjustable.

8. The belt retractor according to claim 6, wherein one of a mechanical actuator (36) and an electrical actuator (36) and a magnetic actuator (36) is provided which can shift said stop (34).

9. The belt retractor according to claim 6, wherein said stop (34) has an abutment surface (37) which can engage said force limiting element (22), said abutment surface (37) being configured in one of a rounded manner and a stepped manner.

* * * * *